United States Patent
Matsumoto et al.

(10) Patent No.: US 6,488,867 B1
(45) Date of Patent: *Dec. 3, 2002

(54) ORGANIC FLUORESCENT WHITENING PIGMENT COMPOSITION HAVING AN EXCELLENT HIDING POWER

(75) Inventors: Shigekazu Matsumoto, Osaka (JP); Takao Yanagisawa, Osaka (JP); Shigehiro Matsumoto, Osaka (JP); Kunio Shimabukuro, Osaka (JP)

(73) Assignee: Hakkol Chemical Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/394,502

(22) Filed: Sep. 13, 1999

(51) Int. Cl.⁷ .............................................. C07D 403/12
(52) U.S. Cl. .................................................. 252/301.21
(58) Field of Search .................................... 252/301.21

(56) References Cited

U.S. PATENT DOCUMENTS

| | | | | |
|---|---|---|---|---|
| 3,871,898 A | * | 3/1975 | Reinert et al. | 252/301.22 |
| 4,888,128 A | * | 12/1989 | Koll et al. | 252/301.23 |
| 5,177,128 A | * | 1/1993 | Lindemann et al. | 524/44 |
| 5,514,213 A | | 5/1996 | Matsumoto et al. | 544/83 |
| 5,606,055 A | | 2/1997 | Matsumoto et al. | 106/498 |
| 5,622,749 A | * | 4/1997 | Rohringer et al. | 252/301.21 |

FOREIGN PATENT DOCUMENTS

| | | | |
|---|---|---|---|
| EP | 60439 | * | 9/1982 |
| EP | 915370 | * | 5/1999 |
| JP | 57-123262 | * | 7/1982 |
| JP | 6-122674 | | 6/1994 |
| JP | 11-129613 | * | 5/1999 |

OTHER PUBLICATIONS

Translation for JP 11–129613.*

* cited by examiner

Primary Examiner—C. Melissa Koslow
(74) Attorney, Agent, or Firm—Sughrue Mion, PLLC

(57) ABSTRACT

The present invention provides an organic fluorescent whitening pigment composition having an excellent hiding power as well as high whiteness, that inorganic pigment compositions cannot achieve, that is, comprising, as a pigment component, a complex salt (compound) represented by the following General Formula:

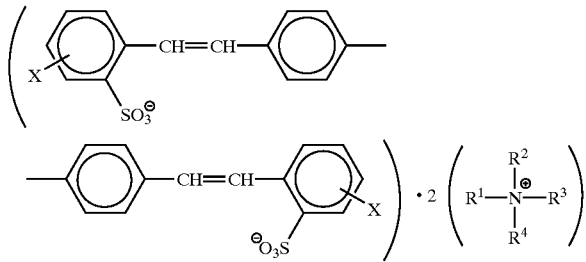

in which X represents same or different hydrogen atom, methyl, ethyl, methoxy, ethoxy, sulfo group or chlorine atom, $R^1$ represents an alkyl, alkenyl, aralkyl, aryl or cycloalkyl group, and $R^2$, $R^3$ and $R^4$ independently represent hydrogen atom or $R^1$, two or three groups of $R^2$, $R^3$ and $R^4$ being capable of forming a heterocyclic group with nitrogen atom in each case.

11 Claims, No Drawings

ORGANIC FLUORESCENT WHITENING PIGMENT COMPOSITION HAVING AN EXCELLENT HIDING POWER

BACKGROUND OF THE INVENTION

1. Field of the Invention

This invention relates to an organic fluorescent whitening pigment excellent in hiding power and more particularly, it is concerned with an organic fluorescent whitening pigment which can be utilized as coating agents for papers, coloring matters for aqueous or oily inks and inkjets, pigment components, for paints, etc., and which is capable of exhibiting excellent properties when applied to a use, in particular, needing high hiding power as well as high whiteness, for example, a coating agent for surface coating of a paper such as photographic printing paper.

2. Description of the Prior Art

Up to the present time, as a pigment component of a white pigment, there are mainly used inorganic materials, for example, titanium oxide, calcium carbonate, zinc oxide, clay, kaolin, talc, etc. On the other hand, there are no organic whitening pigment components having hiding power comparable to or more excellent than that of these pigments components. As a white organic pigment, alkylenebismelamine derivatives have been proposed as disclosed in JP-A-6-122674, which, however, are excellent in hiding power but insufficient in whiteness because of having no fluorescence.

White pigments consisting of inorganic materials of the prior art are excellent in hiding power, but when using these pigments for coating papers, for example, the whiteness of coated papers is not sufficient. Thus, in order to complement this insufficiency, various fluorescent whitening agents such as of bistriazinylaminostylbene type are ordinarily used, but this has some limitations, because the fluorescent whitening agents often meet with such a particular phenomenon as concentration quenching, i.e. that even if using in a concentration of more than certain value, not only more whitening effect cannot be obtained, but also a yellowish hue is rather given. Accordingly, the fluorescent whitening agent can only be used with a very low concentration.

Generally, inorganic pigment components naturally have large densities and when preparing dispersed compositions therefrom, the pigment components tend to be separated and settled, so that a uniform and stable dispersed composition is hard to be prepared. This is not preferred from the stand-point of the storage stability of the pigment dispersed composition. Further, when such a pigment composition is coated onto a paper, for example, the weight of the coated paper is increased. In addition, the inorganic pigment generally has a disadvantage that its compatibility with binders and other reagents required for preparation of the pigment composition is inferior.

SUMMARY OF THE INVENTION

It is an object of the present invention to provide an organic fluorescent whitening pigment having an excellent hiding power as well as high whiteness, that inorganic pigment compositions cannot achieve, whereby the above described problems of the prior art can be solved.

It is another object of the present invention to provide a coating agent for coating a surface of a paper, containing an organic fluorescent whitening pigment having an excellent hiding power as well as high whiteness.

These objects can be attained by an organic fluorescent whitening pigment composition having an excellent hiding power, comprising, as a pigment component a complex salt (compound) represented by the following general formula:

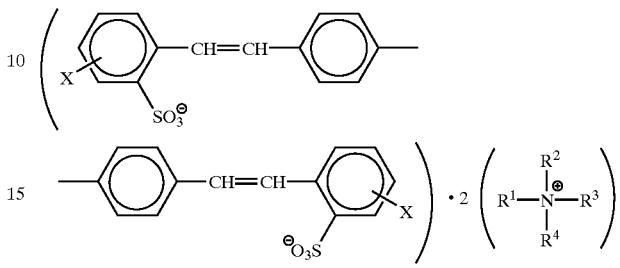

in which X represents same or different hydrogen atom, methyl, ethyl, methoxy, ethoxy, sulfo group or chlorine atom, $R^1$ represents an alkyl, alkenyl, aralkyl, aryl or cycloalkyl group, and $R^2$, $R^3$ and $R^4$ independently represent hydrogen atom or $R^1$, two or three groups of $R^2$, $R^3$ and $R^4$ being capable of forming a heterocyclic group with nitrogen atom in each case.

DETAILED DESCRIPTION OF THE INVENTION

The inventors have made various efforts to solve the above described disadvantages of the inorganic white pigments and consequently, have found that a complex salt obtained from some fluorescent whitening agent and quaternary ammonium compound has very excellent properties as an organic white pigment component. The present invention is based on this finding.

The features of the present invention and embodiments thereof will now be summarized below:

(1) An organic fluorescent whitening pigment composition having an excellent hiding power, comprising, as a pigment component, a complex salt (compound) represented by the following General Formula:

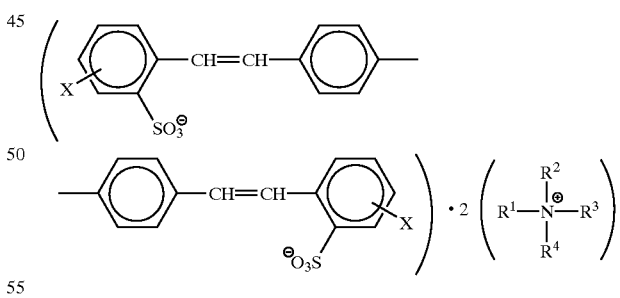

in which X represents same or different hydrogen atom, methyl, ethyl, methoxy, ethoxy, sulfo group or chlorine atom, $R^1$ represents an alkyl, alkenyl, aralkyl, aryl or cycloalkyl group, and $R^2$, $R^3$ and $R^4$ independently represent hydrogen atom or $R^1$, two or three groups of $R^2$, $R^3$ and $R^4$ being capable of forming a heterocyclic group with nitrogen atom in each case.

(2) The organic fluorescent whitening pigment composition having an excellent in hiding power, as described in the above (1), wherein the pigment component is a complex salt (compound) represented by the following formula:

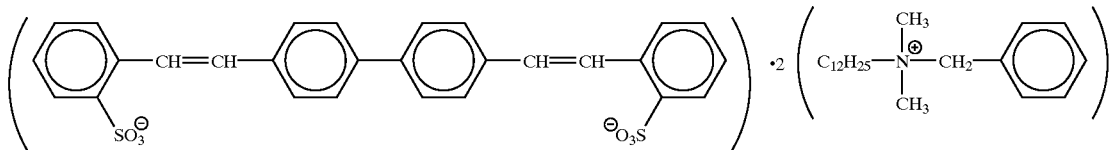

The above described complex salt of the present invention is a substantially water-insoluble fluorescent complex salt, represented by the following general formula:

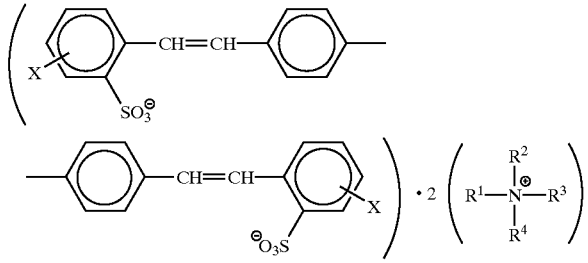

in which X, $R^1$, $R^2$, $R^3$ and $R^4$ have the same meanings as described above, which can be obtained by reaction of a bis-stilbenesulfonic acid derivative or its water-soluble salt, in particular, an alkali metal salt, whose anionic component of the fluorescent whitening agent is generally represented by the following General Formula (I):

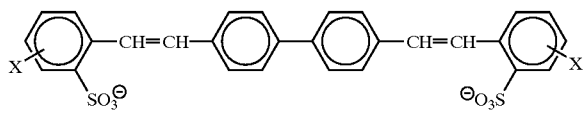

(I)

in which X represents same or different hydrogen atom, methyl, ethyl, methoxy, ethoxy, sulfo group or chlorine atom, with a quaternary ammonium compound represented by the following General Formula (II):

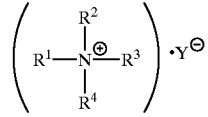

(II)

in which Y represents a colorless, non-fluorescent, water-soluble anion or $OH^-$, $R^1$ represents an alkyl, alkenyl, aralkyl, aryl or cycloalkyl group, $R^2$, $R^3$ and $R^4$ independently represent hydrogen atom or $R^1$ or $R^2$, $R^3$ and $R^4$ can form a heterocyclic group with nitrogen atom in each case.

Furthermore, an organic fluorescent whitening pigment excellent in hiding power can be obtained, consisting of this complex salt as a predominant component.

Other embodiments of the present invention are coating compositions for fluorescent papers comprising the above described fluorescent complex salt mixed in coating compositions for papers, or fluorescent white ink compositions for ink jets comprising the above described fluorescent complex salt mixed in white ink compositions for ink jets, processes for the production of the same, methods of using the same, various materials using the same, in particular, coated papers having excellent hiding power and high whiteness, for example, photographic printing papers (photographic papers), etc.

In white pigment compositions for coating papers or plates, clays, calcium carbonate, titnaium oxide, etc. have hitherto been used as a white pigment component. This is mainly due to the excellent hiding power that these white pigments have.

As a result of our studies, it is found that the organic white pigment of the present invention has more excellent hiding power than the inorganic white pigments consisting predominantly of the above described materials. Further, the white pigment of the present invention is so fluorescent that when using the pigment, a higher whiteness that the prior art cannot reach can be obtained. In addition, this fluorescent property does not exhibit concentration quenching that appears in ordinary fluorescent whitening agents (such a peculiar phenomenon to fluorescent whitening agents that when using a fluorescent whitening agent with a concentration higher than a certain value, the whitening effect is rather lowered to render yellowish sometimes). Thus, the white pigment of the present invention can be used in such a high concentration that cannot be considered in the prior art.

The fluorescent whitening pigment component of the present invention has a smaller density, because of being organic, than inorganic pigments. Accordingly, in the case of forming an aqueous dispersion, for example, the pigment component is hard to be settled and the storage stability is good. In addition, a paper coated with the whitening pigment of the present invention has a smaller weight than papers coated with the above described inorganic pigment, thus resulting in reduction of the transporting cost.

The whitening pigment component of the present invention will be illustrated in detail. In the anionic component of General Formula (I), X can be same or different hydrogen atom, methyl, ethyl, methoxy, ethoxy group, chlorine atom or sulfo group. Above all, the most suitable one is represented by the following General Formula (III):

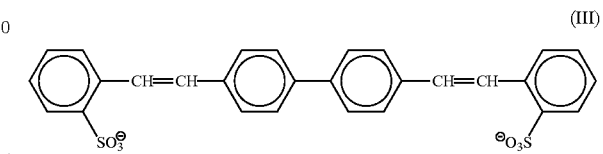

(III)

As the cationic component of General Formula (II), $R^1$ is an alkyl group such as methyl, ethyl, propyl, butyl, dodecyl or octadecyl group, an aralkyl group such as benzyl group, an aryl group such as phenyl group, an alicyclic group such as cyclohexyl group or a five-membered or six-membered heterocyclic group formed with N atom, such as pyrrolidine, piperidine, morpholine or pyridine group, $R^2$, $R^3$ and $R^4$ are independently hydrogen atoms or groups represented by $R^1$ and Y is a quaternary ammonium salt of a halogen atom, preferably chlorine atom, examples of which are represented by the following formulas:

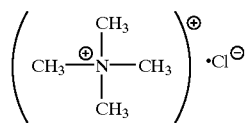 (1)

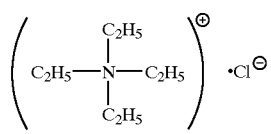 (2)

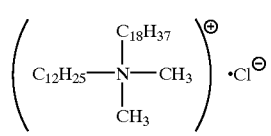 (3)

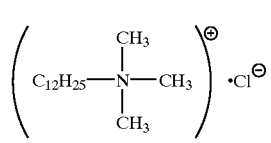 (4)

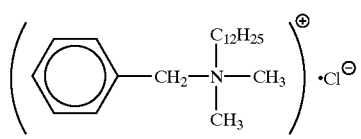 (5)

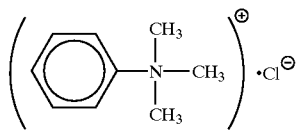 (6)

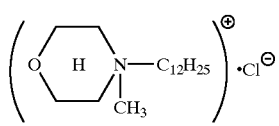 (7)

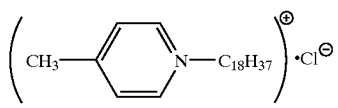 (8)

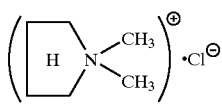 (9)

Preferred examples of the white pigment component according to the present invention are shown in the following Table 1 with specified combinations of groups of General Formulas (I) and (II):

TABLE 1

Anion Component

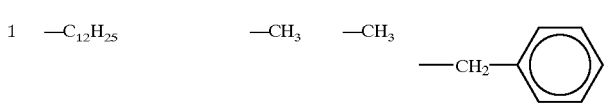

| | —X |
|---|---|
| 1 | —H |
| 2 | —H |
| 3 | —H |
| 4 | —CH$_3$ |
| 5 | —C$_2$H$_5$ |
| 6 | —OCH$_3$ |
| 7 | —Cl |
| 8 | —SO$_3$Na |

Cation Component $$R_1-\underset{R_3}{\overset{R_2}{\overset{|}{\underset{|}{N^{\oplus}}}}}-R_4$$

| | —R$_1$ | —R$_2$ | —R$_3$ | —R$_4$ | Remarks |
|---|---|---|---|---|---|
| 1 | —C$_{12}$H$_{25}$ | —CH$_3$ | —CH$_3$ | —CH$_2$—C$_6$H$_5$ | |
| 2 | —C$_{12}$H$_{25}$ | —CH$_3$ | —CH$_3$ | —CH$_3$ | |

TABLE 1-continued

| | | | | | |
|---|---|---|---|---|---|
| 3 | 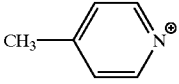 | | | $-C_{18}H_{37}$ | Condensed Heterocylic Ring of $R_1$, $R_2$ and $R_3$ |
| 4 | $-CH_3$ | $-CH_3$ | $-CH_3$ | $-CH_3$ | |
| 5 | $-C_{12}H_{25}$ | $-C_{18}H_{37}$ | $-CH_3$ | $-CH_3$ | |
| 6 | 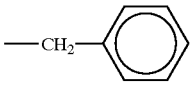 | $-CH_3$ | $-CH_3$ | $-C_{12}H_{25}$ | |
| 7 | 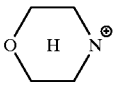 | | $-CH_3$ | $-C_{12}H_{25}$ | Condensed Heterocylic Ring of $R_1$ and $R_2$ |
| 8 |  | | $-CH_3$ | $-C_{12}H_{25}$ | Condensed Heterocylic Ring of $R_1$ and $R_2$ |

The pigment component of the present invention can, for example, be prepared as follows. A sodium salt of a bis-styryl-biphenyl represented by the foregoing General Formula (III) is added to a suitable amount of water and is then subjected to heating and dissolving at about 60° C. with agitation, in which an equivalent or excessive amount of the above described quaternary ammonium compound, dissolved in a suitable amount of water, is poured. Immediately, a white precipitate is deposited and the mixture is heated and stirred at the above described temperature for about 1 hour after the pouring to comlete the reaction. Then, the deposited precipitate is filtered, adequately washed with water and dried at at most 100° C. to obtain a pure white powder of the object complex salt.

The thus obtained white pigment component is provided as a white pigment composition in known forms, for example, in the form of a powder, aqueous dispersion, organic solvent dispersion or paste. The organic solvent used herein includes alcohols, esters, ethers, halogen compounds, hydrocarbons, ketones, etc, illustrative of which are butyl alcohol, ethyl acetate, Cellosolve, trichloroethylene, xylene, turpentine oil, solvent naphtha, methyl ethyl ketone, and the like.

The grain diameter range of the pigment component of the present invention is preferably 1 to 2 μm for paper coating, plastic additives, textile printing, etc., 0.5 to 1.0 μm for photographic papers, ink jet inks, etc., 0.5 to 2.0 μm for baking finish and at most 5 μm for synthetic leathers.

Preparation of the pigment compositions in these forms is generally carried out by dry or wet process using known pulverizers, for example, ball mills, sand mills, speed line mills and jet mills. If necessary, the pigment composition is converted into an aqueous dispersion with a surfactant and water using the above described pulverizers and then subjected to spray drying to prepare a powdered dispersion composition.

During the preparation of the above described dispersion composition, a suitable known surfactant is generally used. Depending on the variety of the form or the use of the composition, a suitable one is mainly selected from anionic and nonionic active agents, but in particular, nonionic active agents are preferably used. Furthermore, during or after the preparation of the dispersion composition, commonly used known additives for such pigment compositions, for example, antigelling agents, protective colloids, antiseptics or wetting agents can be added thereto. In the preparation of the dispersion, a suitable pigment concentration is 5 to 50%, preferably 20 to 35% in water or organic solvents.

The important feature of the white pigment composition according to the present invention consists in excellent hiding power as well as high whiteness. For example, when, using a pigment composition shown in the following Preparation Example, an aqueous dispersion composition (pigment concentrations=25%, average grain diameter=0.5 μm) was prepared and another aqueous dispersion composition of titanium dioxide as a pigment component, having the same concentration and same composition were coated and dried under the following conditions:

| | |
|---|---|
| Wire Rod | No. 14, 30 (Blackboard Paper) |
| Coating Temperature | Room Temperature |
| Drying Condition | 120° C., 1 minute |

The whiteness and hiding power of the thus resulting black board paper and Kinshapaper (commercial name) were compared to obtain results as shown in Table 2. In Table 2, the larger is the numerical value, the more excellent is the whiteness. The numerical value of Whiteness (W) shown in Table 2 was obtained from values of Y and Z, measured by means of a color difference meter of SZ-Σ 90 type (commercial name), manufactured by Nippon Denshoku KK, by which any five sites of an object were taken and subjected to measurement and an average value was obtained.

TABLE 2

| | | Y | Z | Whiteness (W) |
|---|---|---|---|---|
| 1 | Kinshapaper of Original | 80.59 | 92.32 | 71.01 |
| 2 | Kinshapaper by Our Invention | 88.13 | 117.07 | 132.24 |
| 3 | Kinshapaper of Titanium Oxide | 84.95 | 97.54 | 75.61 |
| 4 | Black Board Paper of Original | 4.68 | 5.55 | 4.76 |
| 5 | Black Board Paper by Our Invention | 78.40 | 108.69 | 133.04 |

TABLE 2-continued

|   | | Y | Z | Whiteness (W) |
|---|---|---|---|---|
| 6 | Black Board Paper of Titanium Oxide | 70.60 | 88.10 | 86.68 |

Note:
Whiteness (W) is Taube Whiteness, calculated by the following formula, in which the measured values of Y and Z are inserted. This is an index for showing the surface whiteness of papers or pulps, commonly used in the technical field of papers and pulps.
Taube Whiteness = 4 × 0.847Z − 3Y As is evident from Table 2, the Kinshapaper and Blackboard Paper having the whitening pigment composition coated according to the present invention are all more excellent in whiteness than those using titanium oxide. This teaches that our whitening pigment composition is also excellent in hiding power.

Another feature of the pigment composition of the present invention consists in that the density of the pigment component composing it is smaller than that of inorganic pigment components because of being organic. This means, for example, that when preparing an aqueous dispersion using the pigment composition of the present invention, grains of the pigment component are hard to be settled and the storage stability of the pigment component is improved. The present pigment composition-coated paper has a smaller weight than papers coated with inorganic pigment-compositions, resulting in reduction of transporting costs and mailing costs. Comparison of the densities of the pigment composition of the present invention, for example, represented by the following structural formula:

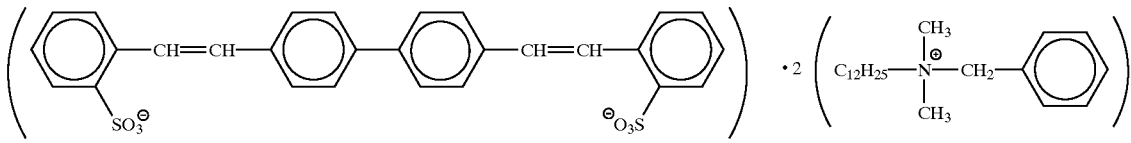

and inorganic pigment components is summarized below:

TABLE 3

| Pigment Component | Density |
|---|---|
| Present Invention | 1.1 |
| Clay | 2.46–2.63 |
| Talc | 2.6–2.8 |
| Titanium Oxide | 3.7–3.9 |
| Calcium Carbonate | 2.83 |
| Zinc Oxide | 5.4–5.7 |

As apparent from Table 3, the pigment component of the present invention has a density of at most ½ times as large as clay having the smallest density of inorganic pigment components. The densities shown in Table 3 are measured by a method using a specific gravity bottle of the solid specific gravity measuremnt methods according to JIS Z 8807.

Another advantage of the organic pigment component of the present invention is that it is excellent in miscibility with various binders such as gelatin, styrene-butadiene type, polyvinyl acetate type, acryl-styrene type (co-)-polymers, acrylic acid esters polymers, etc., gelling inhibitors, protective colloids and preservatives. Thus, the pigment components of the present invention are suitable as a base for coating agents of surface-coated papers, in particular, photographic printing papers or coated papers.

The present invention will now be illustrated in detail by Preparation Examples of the pigment components of the present invention and Examples using the pigment compositions, in which percents are to be taken as those by weight unless otherwise indicated.

Preparation Example 1 of Pigment Component 100 g of Uvitex CBS-X (—commercial name— fluorescent whitening agent manufactured by Ciba Geigy Co., containing sodium salt of the foregoing formula (III) as an effective component) was added to 1000 ml of water, heated at about 60° C. and dissolved with agitation. 300 ml of Catiogen PAN (—commercial name—cationic surfactant manufactured by Daiichi Kogyo Seiyaku KK) was poured therein, then reacted at the above described temperature for about 1 hour, and the precipitated crystals were filtered, washed with water and dried at 100° C., thus obtaining 192 g of pure white powder.

This powder is a complex salt, one of the pigment components of the present invention, represented by the following formula.

When the above described procedure was repeated using Catiogen L or Catiogen H in place of Catiogen PAN, the pigment components of the present invention were obtained, whose cationic components in the above described formula were respectively represented by the following formula:

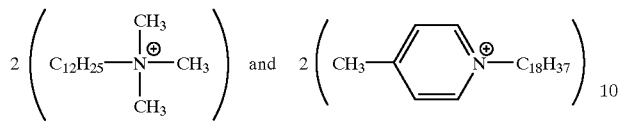

Preparation Example 1 of Pigment Composition (Aqueous Dispersion)

| | |
|---|---|
| Pigment Component of Present Invention (Preparation Example 1) | 25.0% |
| Emulsit 9 (-commercial name-) | 1.0% |
| Neugen EA-130T (-commercial name-) | 0.4% |
| Water | 73.6% |
| Total | 100.0% |

The mixed liquid having the above described composition was pulverized and dispersed by means of a sandmill until the average grain diameter was at most 0.5 µm to thus obtain an aqueous dispersion composition of a fluorescent organic white pigment comprising 25.0% concentration of the pigment component and being excellent in hiding power. In the above described formulation, Emulsit 9 and Neugen EA-130T are all nonionic surfactants manufactured by Dauich Kogyo Seiyaku KK.

Preparation Example 2 of Ultra-fine Powder for Pigment Composition

About 1 kg of the white powder obtained in Preparation Example 1 of Pigment Component was subjected to a pulverizer of Counter Jet Mill 100 AFG of fluidized bed type (—commercial name—manufactued by Hosokawa Micron KK) to obtain an ultra-fine powder with an average grain diameter of 1 to 2 µm for about 1 hour.

Preparation Example 3 of Oily Dispersion Composition

A mixture comprising 25 kg of the white pigment powder obtained in Preparation Example 1 of Pigment Component, 8.4 kg of a butyral dispersed resin and 66.6 kg of ethanol was subjected to a pulvering treatment using Sand Grinder of continuous and vertical type (—commercial name—manufactured by Igarashi Kikai Seizo KK) until the average grain diameter was 0.3 to 0.4 µm to thus obtain a dispersion composition in an alcohol medium.

Example 1

Surface Coating of Paper

A surface coating composition of paper having the following composition was prepared:

| | |
|---|---|
| White Pigment Ultra-fine Powder of Preparation Example 2 | 25.0 g |
| Sodium Hexametaphosphate | 0.3 g |
| Alon T-40 (-commercial name- anionic dispersant, manufactured by Toa Gosei Kagaku Kogyo KK) | 0.25 g |
| Latex (JSR 0692) | 6.3 g |
| 25% aqueous ammonia solution | 0.7 g |
| Water | 67.45 g |
| Total | 100.0 g |

The above described composition was coated onto a commercially available high quality paper to give a coating amount of 15 g/cm² using Wire Rod No. 14 (—commercial name—) at room temperature and dried at 120° C. for 1 minute.

The resulting coated paper exhibited much clearer whiteness, luster and smoothness as compared with a paper coated with a coating composition using titanium oxide in place of the white pigment ultra-fine powder of the present invention in the above described coating composition.

Example 2

Coating of Photographic Paper

A polyethylene with a density of 0.925 g/cm² containing a fluorescent white pigment ultra-fine powder (Preparation Example 3) of the present invention in a proportion of 10% of the polyethylene was coated onto a photographic paper of a coating weight ratio of 150 g/m² containing a sizing agent and wet strengthening agent to give a thickness of 40 µm, which was further subjected to a high frequency corona discharge treatment. The back side was further coated in the similar manner to the right surface with a mixture of polyethylene having a density of 0.925 g/cm² and polyethylene having a density of 0.955 g/cm² in a mixing ratio of 1:1 to obatin a thickness of 45 µm. The thus obtained polyethylene-coated photographic paper containing the fluorescent whitening pigment of the present invention exhibited much clearer whiteness, which was then maintained even after coating of photographic emulsions and other photographic processings.

Example 3

Coloring Material for Ink Jet

A white paint composition for drying at normal temperature having the following mixing proportions was prepared:

| | |
|---|---|
| Water | 52.5 g |
| Tamor 731 (25%, -commercial name- anionic surfactant, manufactured by R & H Co.) | 9.0 g |
| Neugen EA-120 (-commercial name- nonionic surfactant manufactured by Daiichi Kogyo Seiyaku KK) | 2.2 g |
| White Pigment Ultra-fine Powder of Preparation Example 1 | 275.0 g |
| Ethylene Glycol | 50.0 g |
| Defoaming Agent | 2.0 g |
| 25% aqueous ammonia solution | 1.0 g |
| Boncoat EC-880 (50%, -commercial name- acryl-styrene emulsion, manufactured by Dainippon Ink Kagaku Kogyo KK) | 853.8 g |

-continued

| | |
|---|---|
| High Molecular Emulsion Thickener | 34.8 g |
| Texanol SC-12 (-commercial name- silicone resin film making aid, manufactured by Chisso KK) | 60.7 g |
| Total | 1341.0 g |

(pigment concentration: about 20.5%)

This composition is suitable as a coloring material for an ink jet, capable of giving a white image and excellent in brightening property, water-proof property and storage stability. Furthermore, this composition is free from clogging with the pigment at the end of the ink jet.

Example 4

Preparation of Printing Paste

| | |
|---|---|
| White Pigment Ultra-fine Powder of Preparation Example 2 | 30 g |
| NK-Couper A-1 (-commercial name- acrylic copolymer, manufactured by Shin-Nakamura Kagaku Kogyo KK) | 70 g |
| Total | 100 g |

A printing paste having the above described composition was printed on a cotton cloth in knwon manner, previously dried at 100° C. for 1–2 minutes and then heat-treated at 146° C. for 3 minutes. On the cotton cloth was obtained a clear white printed pattern excellent in feeling and washing fastness.

Example 5

Addition to Polyvinyl Chloride Resin

| | |
|---|---|
| Polyvinyl Chloride | 650 g |
| Dioctyl Phthalate | 350 g |
| Stabilizer (based on polymer) | 2% |
| White Pigment Ultra-fine Powder of Preparation Example 3 | 15% |

A mixture for molding polyvinyl chloride, having the above described composition, was subjected to roller mill at 150 to 160° C. for 1 hour and extruded to shape in a film. Thus, an opaque polyvinyl chloride resin film having clear whiteness was obtained.

Example 6

Surface Coating of Urethane Synthetic Leather

| Liquid Composition for Surface Skin Layer | |
|---|---|
| CRISVON 7367 SL (-commercial name- urethane resin liquid, solid component 35%, manufactured by Dai-Nippon Ink Kagaku Kogyo KK) | 100 g |
| White Pigment Ultra-fine Powder of Preparation Example 1 | 25 g |

-continued

| | |
|---|---|
| Methyl Ethyl Ketone | 30 g |
| Dimethylformamide | 10 g |
| Total | 165 g |

| Liquid Composition for Adhesive Layer | |
|---|---|
| CRISVON 4010 HV (-commercial name- thermal setting urethane resin liquid) | 100 g |
| CRISVON NX (-commercial name- isocyanate crosslinker) | 8 g |
| CRISVON Accel HM (-commercial name- crosslinking promoter) | 3 g |
| Dimethylformamide | 5 g |
| Toluene | 5 g |
| Total | 121 g |

| Composition for Surface Finish Layer | |
|---|---|
| GIOSILAC CLEAR L-0465 (-commercial name-, manufactured by Dai-Nippon Ink Kagaku Kogyo KK) | 100 g |
| GIOSILAC MAT L-0465 (-commercial name-) | 50 g |
| Thinner | 50 g |
| Total | 200 g |

The above described liquid composition for a surface skin layer was coated onto a mold releasing paper by a doctor knife with a coating amount of 130 g/m$^2$ and then dried with hot air at 90 to 110° C. for 2 minutes. The above described liquid composition for an adhesive layer was then coated on the surface skin layer with a coating amount of 150 g/m$^2$ and simultaneously combined with a base cloth (cotton raising cloth, thickness 1 mm) at a suitable gap of lamination rolls, followed by drying with hot air at 110 to 130° C. for 2 minutes. The resulting assembly was then subjected to ageing at 50 to 60° C. for three days under wound-up state. Then, the mold releasing paper was released and surface finishing was carried out for several times by gravure rolls using the above described liquid composition for surface finishing, thus obtaining an urethane synthetic leather having a clear whiteness.

Example 7

Pigment Composition for Baking Finish

| | |
|---|---|
| White Pigment Ultra-fine Powder of Compound No. 6 in Table 1 | 70 g |
| Commercially Available Coconut Oil Alkyd Resin | 116.7 g |
| n-Butylated Melamine Resin | 50 g |
| Total | 236.7 g |

A pigment composition for baking finish having the above described composition was prepared. Using xylene as a thinner, this composition was spray-coated (film thickness 30–35 μm on dry base) on a soft steel plate of 0.8 mm thick using an air spray, allowed to stand (setting) at room temperature for 15 minutes and heat treated at 130° C. for 20 minutes. The thus resulting coating had a clear whiteness and good lustre.

Advantages of the Invention

The organic fluorescent whitening pigment of the present invention is excellent in hiding power and the whiteness thereof is more excellent than that of inorganic white pigments such as titanium oxide, etc. In addition, the present white pigment composition is free from the concentration quenching phenomenon taking place when using general fluorescent whitening agent, so it can be used with a larger concentration.

The white pigment of the present invention has excellent miscibility with various polymers, binders, surfactants or other additives because of being organic and very good dispersion stability as well as good storage property such that pigment components do not cause aggregation, nor seeding or separating during storage because of having smaller density.

Furthermore, the white pigment of the present invention can favorably be added to polymers because of being excellent in heat resistance as well as miscibility with various polymers.

As described above, the organic fluorescent whitening pigment components of the present invention can widely be applied to coating agents for papers, whiteness improvers of photographic papers, printing papers, etc., aqueous or oily paints for various coating purposes, whitening agents of dyes for ink jets, printing inks, pigments for crayons, pigments for printing or various polymers.

What is claimed is:

1. A fluorescent white organic pigment composition in the form of an aqueous dispersion having an excellent hiding power, comprising a binder, an anionic active agent, and as an organic pigment component, a complex salt (compound) represented by the following General Formula:

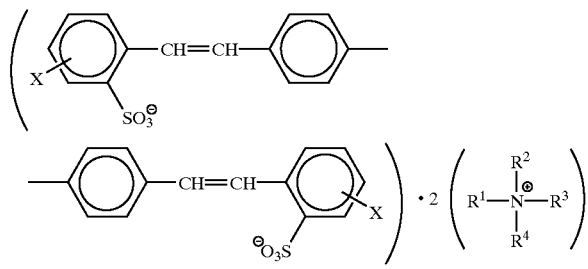

in which the two Xs are the same or different and each represents a hydrogen atom, a methyl group, an ethyl group, a methoxy group, an ethoxy group, a sulfo group or a chlorine atom, $R^1$ represents an alkyl, alkenyl, aralkyl, aryl or cycloalkyl group, an $R^2$, $R^3$, and $R^4$ independently represent a hydrogen atom or $R^1$, two or three groups of $R^2$, $R^3$, and $R^4$ being capable of forming a heterocyclic group with nitrogen atom in each case, and being in the form of an aqueous dispersion, wherein the binder is an acryl-styrene copolymer and the organic pigment component is present in an amount of about 20.5 wt %, or the binder is a latex and the organic pigment component is present in an amount of 25 wt %.

2. The composition according to claim 1, wherein the binder is an acryl-styrene copolymer.

3. The composition according to claim 1, wherein the binder is a latex.

4. A fluorescent whitening organic pigment composition having an excellent hiding power in the form of an organic solvent dispersion, comprising, as an organic pigment component, a complex salt (compound) represented by the following General Formula:

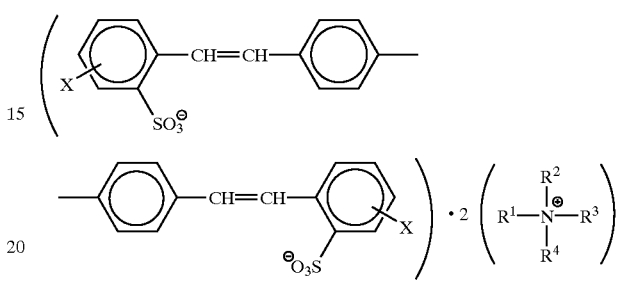

in which the two X's are the same or different and each represents a hydrogen atom, a methyl group, an ethyl group, a methoxy, an ethoxy group, a sulfo group or a chlorine atom, $R^1$ represents an alkyl, alkenyl, aralkyl, aryl or cycloalkyl group, and $R^2$, $R^3$ and $R^4$ independently represent a hydrogen atom or $R^1$, two or three groups of $R^2$, $R^3$ and $R^4$ being capable of forming a heterocyclic group with nitrogen atom in each case, and wherein the solvent is selected from halogen compounds, hydrocarbons and ketones.

5. The organic fluorescent whitening organic pigment composition having an excellent hiding power as claimed in claim 4, wherein the pigment component is a complex salt (compound) represented by the following formula:

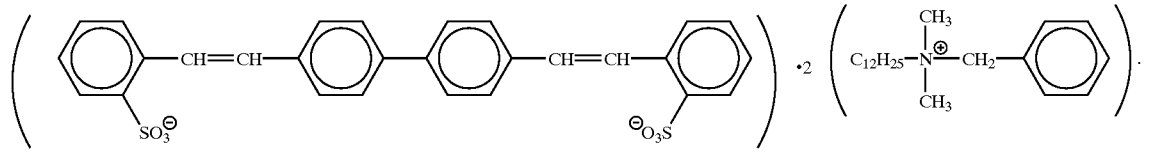

6. The fluorescent whitening organic pigment composition having an excellent hiding power as claimed in claim 4, wherein the solvent is selected from xylene, turpentine oil, solvent naphtha, and methyl ethyl ketone.

7. A fluorescent whitening organic pigment composition according to claim 4, wherein the pigment is present in an amount of 5 to 50%.

8. A fluorescent whitening organic pigment composition according to claim 4, wherein the pigment is present in an amount of 20 to 35%.

9. A fluorescent whitening organic pigment composition according to claim 4, wherein the pigment is present in an amount of about 15%.

10. A fluorescent whitening pigment composition according to claim 5, wherein the pigment is present in an amount of about 25%.

11. A fluorescent whitening pigment composition according to claim 6, wherein the pigment is present in an amount of about 20%.

* * * * *